US010460603B2

United States Patent
Walessa et al.

(10) Patent No.: US 10,460,603 B2
(45) Date of Patent: Oct. 29, 2019

(54) METHOD FOR PROVIDING OBSTACLE MAPS FOR VEHICLES

(71) Applicant: Bayerische Motoren Werke Aktiengesellschaft, Munich (DE)

(72) Inventors: Marc Walessa, Munich (DE); Oliver Kormann, Ilsfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 183 days.

(21) Appl. No.: 15/713,115

(22) Filed: Sep. 22, 2017

(65) Prior Publication Data

US 2018/0012494 A1   Jan. 11, 2018

Related U.S. Application Data

(63) Continuation of application No. PCT/EP2016/055212, filed on Mar. 11, 2016.

(30) Foreign Application Priority Data

Mar. 24, 2015 (DE) ........................ 10 2015 205 244

(51) Int. Cl.
  *G08G 1/16* (2006.01)
  *G01S 15/93* (2006.01)
  (Continued)

(52) U.S. Cl.
  CPC ............... *G08G 1/16* (2013.01); *B60W 40/02* (2013.01); *B60W 40/04* (2013.01); *G01S 15/931* (2013.01);
  (Continued)

(58) Field of Classification Search
  None
  See application file for complete search history.

(56) References Cited

U.S. PATENT DOCUMENTS 7,365,831 B2   4/2008   Braeunl et al.
7,416,042 B2 *  8/2008   Czaykowska ....... B60R 21/0132
                                                       180/268
(Continued)

FOREIGN PATENT DOCUMENTS

DE          102 44 148 A1    4/2004
DE     10 2011 081 740 A1    3/2012
(Continued)

OTHER PUBLICATIONS

PCT/EP2016/055212, International Search Report dated Jun. 6, 2016 (Three (3) pages).
(Continued)

*Primary Examiner* — Shelley Chen
(74) *Attorney, Agent, or Firm* — Crowell & Moring LLP

(57) ABSTRACT

A method for the preparation of an obstacle map, wherein the obstacle map comprises cells, includes assigning each of the cells to segments of an environment of the vehicle, and assigning to each of the cells information as to whether the corresponding segment of the environment is occupied by an obstacle. The method also includes preparing an environment map that comprises the cells, and determining a threshold value specification, where the threshold value specification specifies different threshold values for the cells of the environment map. The threshold value specification is determined depending on a trajectory of the vehicle. An obstacle map is then determined on the basis of the environment map and the threshold value specification.

20 Claims, 4 Drawing Sheets

1

(51) Int. Cl.
*G06K 9/00* (2006.01)
*B60W 40/04* (2006.01)
*B60W 40/02* (2006.01)

(52) U.S. Cl.
CPC ..... *G06K 9/00805* (2013.01); *B60W 2420/52* (2013.01); *B60W 2420/54* (2013.01); *B60W 2520/06* (2013.01); *B60W 2550/10* (2013.01)

(56) References Cited

U.S. PATENT DOCUMENTS

| | | | |
|---|---|---|---|
| 7,961,084 B2 * | 6/2011 | Aso ..................... | G08G 1/161 340/435 |
| 8,244,458 B1 * | 8/2012 | Blackburn ............. | G08G 1/166 340/435 |
| 8,744,744 B2 | 6/2014 | Takagi | |
| 2006/0108787 A1 * | 5/2006 | Czaykowska ....... | B60R 21/0132 280/806 |
| 2008/0303696 A1 * | 12/2008 | Aso ..................... | G08G 1/161 340/935 |
| 2014/0165898 A1 * | 6/2014 | Cierpka ................. | G01S 15/89 114/312 |
| 2014/0278049 A1 | 9/2014 | Grewe et al. | |
| 2015/0198456 A1 * | 7/2015 | Ishikawa ............ | G01C 21/3632 701/437 |
| 2015/0239472 A1 * | 8/2015 | Sudou ................... | B60W 30/16 702/96 |
| 2016/0272215 A1 * | 9/2016 | Laine ..................... | G08G 1/165 |
| 2016/0274239 A1 * | 9/2016 | Gupta ................... | G01S 17/936 |
| 2016/0313133 A1 * | 10/2016 | Zeng ............... | B60W 30/18163 |

FOREIGN PATENT DOCUMENTS

| | | |
|---|---|---|
| DE | 10 2011 113 016 A1 | 3/2012 |
| DE | 10 2013 207 905 A1 | 10/2014 |

OTHER PUBLICATIONS

German Search Report issued in German counterpart application No. 10 2015 205 244.3 dated Oct. 1, 2015, with Statement of Relevancy (Eight (8) pages).

* cited by examiner

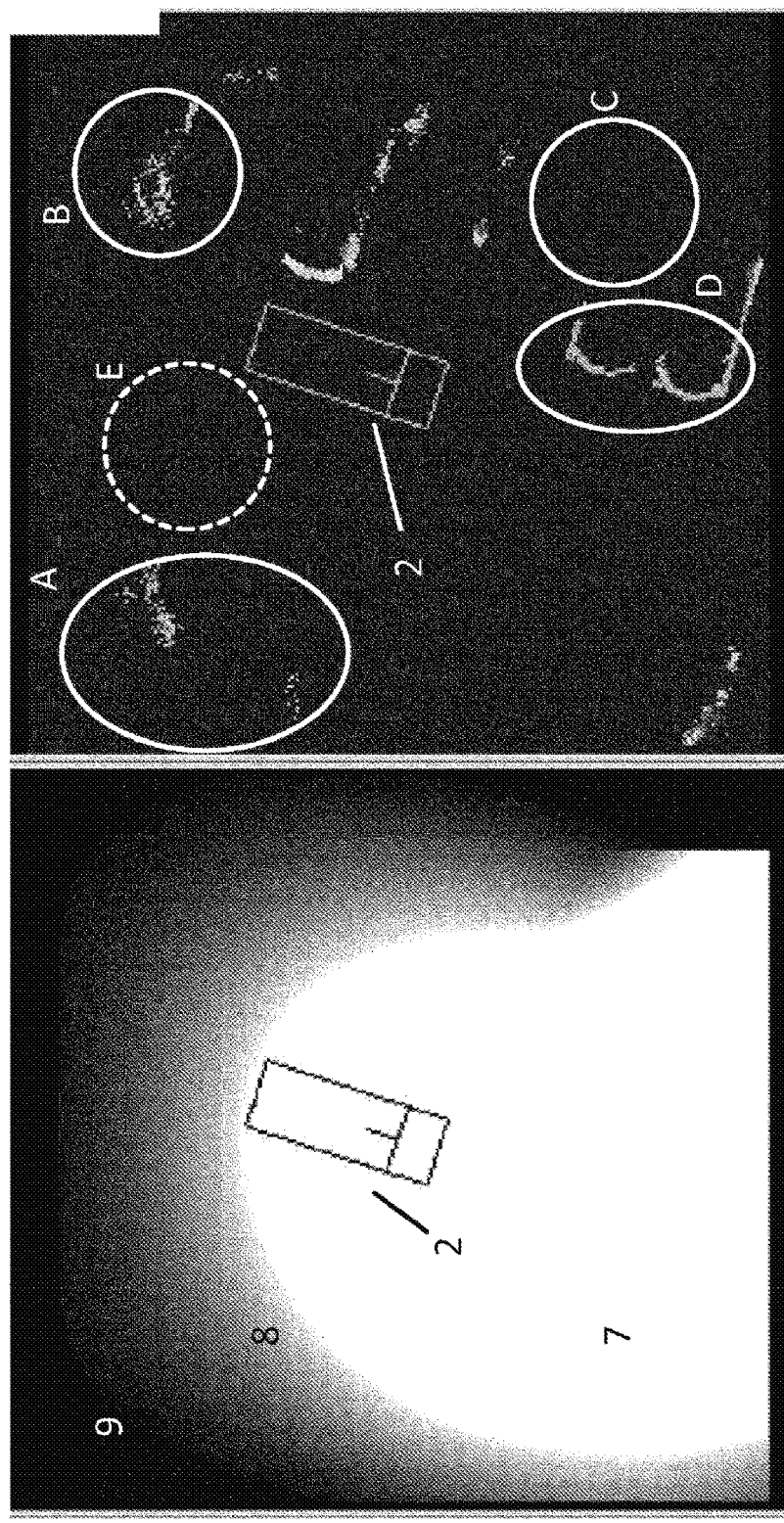

METHOD FOR PROVIDING OBSTACLE MAPS FOR VEHICLES

CROSS REFERENCE TO RELATED APPLICATIONS

This application is a continuation of PCT International Application No. PCT/EP2016/055212, filed Mar. 11, 2016, which claims priority under 35 U.S.C. § 119 from German Patent Application No. 10 20152 052 44.3, filed Mar. 24, 2015, the entire disclosures of which are herein expressly incorporated by reference.

BACKGROUND AND SUMMARY OF THE INVENTION

The invention relates to a method for the preparation of an obstacle map and of a correspondingly designed electronic control device.

Acquisition of the environment of the vehicle is indispensable for many future driving functions and driver assistance systems of a vehicle, in particular automatic driving, parking assistant, etc. In particular it is usually necessary to establish which segments of the environment are not blocked by obstacles and can thus be driven on without restriction. The acquisition of the environment is here carried out with various sensor systems such as camera groups, radar, lidar and ultrasonic sensors. An environment map, frequently also called an occupancy grid, is typically used as a model for modeling the environment of a vehicle for different driver assistance systems based on cameras or generally on sensors (e.g. a parking assistant).

An environment map comprises environment data that results from processing sensor measurements of the environment, and which represents them. The environment data is here usually arranged according to segments of the environment. The environment data that results from measurements in a segment is assigned to that segment. The environment data can comprise different types of information, depending on the cell, for example the occupancy probability of the respective cell (i.e. the probability that the cell is occupied by an obstacle), the height of the obstacle, and so forth.

To model the environment, many driver assistance functions do not require the abstract occupancy probability as information, but rather the information as to whether a segment of the environment is occupied by an obstacle or not. An obstacle in a segment signifies here that the segment of the environment cannot be driven on at all with the vehicle, or only under certain conditions.

To provide the obstacle information, an obstacle map is typically generated comprising cells, each of which is assigned to segments of the environment of the vehicle, and to each of which the information as to whether the corresponding segment of the environment is occupied by an obstacle is assigned. Typically the cells of the obstacle map correspond to the cells of the environment map and the associated segments are the same. The information as to whether a segment is occupied by an obstacle is determined through the comparison of the occupancy probability of the environment map assigned to the segment with a threshold value. In many versions it is moreover possible to take the obstacle height determined for the segment into account.

Sensor systems are known in the motor vehicle field that can detect obstacles by means of a method known as "Structure From Motion" (SFM) using sequential camera recordings of the vehicle taken from different positions. This detection is, however, often faulty. Therefore, in order to generate meaningful occupancy probabilities in an environment map, the occupancy probability of a segment detected by SFM is often computationally modified with previously detected occupancy probabilities of the same segment. An accumulation of the detected occupancy probabilities of a cell of the environment map thus takes place.

At the same time, in the SFM method, the correct detection of the occupancy probability by an obstacle in a segment depends on the distance from the vehicle and on the angle to the longitudinal vehicle axis. Obstacles directly in front of the vehicle, for example, are more frequently recognized incorrectly than obstacles to the side of the vehicle. Even with an accumulation of the occupancy probabilities determined in a temporal sequence, obstacles in the environment map are represented by different occupancy probabilities.

When the obstacle map is generated on the basis of the environment map through the formation of threshold values, the problem thus arises that obstacles that, as a result of the detection characteristics of SFM, are only inadequately represented by occupancy probabilities, are not recorded in the obstacle map.

An aspect of the invention relates to a method for the preparation of an obstacle map, wherein the obstacle map comprises cells, each of which is assigned to segments of the environment of the vehicle, and to each of which the information as to whether the corresponding segment of the environment is occupied by an obstacle is assigned, wherein the method comprises: the preparation of an environment map, wherein the environment map contains cells, each of which is assigned to segments of the environment of the vehicle, and to each of which an obstacle probability is assigned that represents the probability that the corresponding segment of the environment is occupied by an obstacle; the preparation of a threshold value specification; wherein the threshold value specification for cells of the environment map specifies different threshold values; wherein the threshold value specification is determined depending on the trajectory, in particular on a part of the previous trajectory, of the vehicle; determination of the obstacle map on the basis of the environment map and depending on the threshold value specification. The threshold value specification can comprise an explicit statement of threshold values for each cell of the environment map (also known as the threshold value map), or can be represented in a closed form (formula) from which the threshold value for individual cells of the environment map can be determined. The threshold value map is sometimes also called the exploration grid. Sensor readings from a plurality of sensor systems, such as measurements from camera systems and ultrasonic systems, can be included in the preparation of the environment map. At the same time, the threshold value specification can take the detection properties (in particular the dependency on direction and distance) of the sensor system of the vehicle into account, with which the occupancy probabilities of the environment segments are determined.

It is thus proposed at this point that a constant threshold value, as in the prior art, is not used, but rather a threshold value that varies depending on the segment (or depending on the cell). The variation of the threshold value can be selected in such a way that the different detection properties of obstacles by the sensors of the vehicle are taken into account. A higher threshold value is chosen for those segments for which the detection properties of the sensor represent obstacles with a high occupancy probability. Conversely, a lower threshold value is selected for those segments in which obstacles are represented by lower occupancy probabilities. The threshold values specified for the segments by the threshold value pattern can also depend on the driving function that is being carried out on the basis of the obstacle map.

The trajectory of the vehicle is a part of this consideration. It determines those segments for which the sensor properties are effective, i.e. in which segments of the environment obstacles are represented with a high occupancy probability, and in which segments obstacles are represented with a low occupancy probability. Typically the threshold value specification will set a lower threshold value for environment segments in the direction of travel in front of the vehicle than for segments that the former driving trajectory has passed to the side.

In this way obstacles located more remotely in front of the vehicle in the direction of travel are also correctly detected in the creation of the obstacle map. At the same time, obstacles that, due to the sensor properties, are to a larger extent detected (and have a correspondingly higher occupancy probability in the environment map) are also detected. Noise which frequently occurs in those regions in which, due to the sensor properties, obstacles are represented by high occupancy probabilities, is also effectively suppressed in the creation of the obstacle map.

In an advantageous implementation, a threshold value pattern is repeatedly taken into account for determination of the threshold value specification; wherein the threshold value pattern gives different threshold value increments for different cells of a group of cells. The number of cells in the group of cells can be smaller than the number of cells of the environment map. The threshold value pattern can be a threshold value pattern map which specifies threshold value increments for individual cells. The threshold values given by the pattern advantageously follow a Gaussian function or a linear function. The threshold value pattern here reflects the properties of the obstacle detection of the sensor system in the case of a single measurement (wherein a single measurement here is to be understood as the data basis with which the updating of the environment map is performed, and which can very well incorporate a plurality of raw measurements). The threshold value pattern can also take the properties of different sensor systems, for example SFM camera systems and ultrasound, into account. Complex threshold value patterns can result from this.

The threshold value pattern is typically applied or taken into account repeatedly without change. A specified initial threshold value specification can be the starting point. The threshold value pattern is repeatedly added to this, this being done depending on the trajectory of the motor vehicle. The threshold value of individual cells of the environment map can here be limited to a maximum value of, for example, 0.9.

The incremental development of the threshold value specification entails the advantage that each sequential determination of the obstacle map can be built on top of the previous threshold value specification. Only the threshold value pattern corresponding to the current vehicle position is added to the most recently determined threshold value specification. The new vehicle position can also be reflected by a shift in the environment map or of its contents.

As long as the updating of the environment map (on the basis of new sensor measurements) takes place at regular intervals of time or distance, the accumulation (or the preparation of the updated threshold value pattern) can be carried out in the same time segments or, if the incorporation depends on covering a drive path, according to predetermined distance sections of the drive trajectory.

One or a plurality of considerations or accumulations (additions) to the threshold value pattern can be performed between the determination of a pair of obstacle maps, in order to determine the threshold value specification that is then to be applied. This can depend on the number of new sensor measurements incorporated (i.e. on their newly detected occupancy probabilities of the segments of the environment). The threshold value pattern, in particular the height of the threshold value increments, can also depend on the number of updates to the environment map through respective, new sensor measurements of the environment.

The threshold value pattern can be taken into account in the determination of the threshold value specification depending on the position and/or alignment of the vehicle in the environment map. This thus means that when the threshold value pattern is applied to the initial threshold value map, the threshold value increments to be added in the individual cells of the threshold value map (based on the specifications of the threshold value pattern) are determined with reference to the vehicle position. In other words: the threshold value pattern comprises a reference point, for example the symmetrical point of the pattern (and potentially also a reference direction), which is oriented to the vehicle position (and potentially the vehicle orientation).

In advantageous implementations, the same segment of the environment is assigned to each cell of the environment map as cells of the obstacle map; wherein the information for a cell of the obstacle map is obtained through a comparison of the occupancy probability of the corresponding cell of the environment map with a threshold value given for the corresponding cell of the environment map in accordance with the threshold value specification. The cell structures of the obstacle map and the environment map thus correspond to one another.

Another aspect of the invention relates to an electronic control device for vehicles, wherein the control device is designed to execute one of the methods described above. The control device can be a microcontroller, a CPU, an ASIC or RISC. A further aspect of the invention relates to a vehicle, in particular an automobile, comprising the control device.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 is a measurement diagram showing an obstacle map according to an exemplary embodiment of the invention.

FIG. 4 is a diagram showing, by way of example, a threshold value map according to the invention, as is used for determination of the FIG. 3.

The same reference signs refer to corresponding elements across the figures.

DETAILED DESCRIPTION OF THE DRAWINGS

Figure 1:
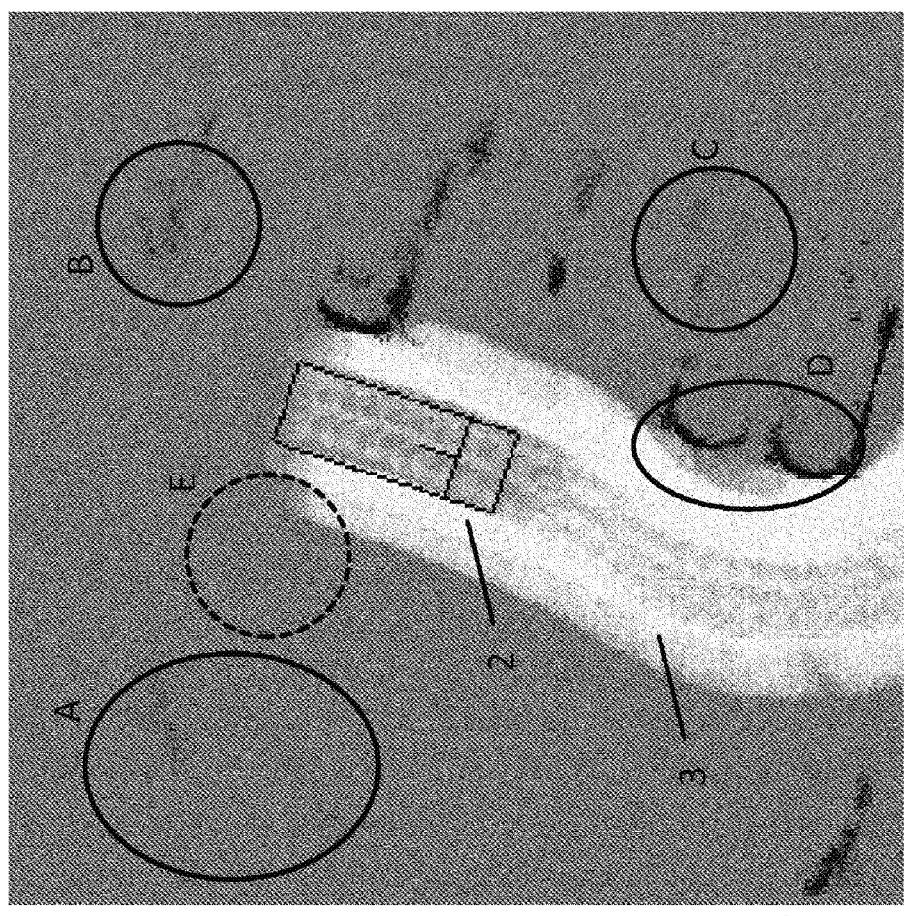
FIG. 1 is a measurement diagram showing an environment map according to an exemplary embodiment.

The FIG. 1 shows an environment map 1 according to an exemplary embodiment. The environment map comprises 256×256 cells, whose assigned occupancy probability is illustrated by means of gray levels. White means that the corresponding segment of the environment is registered as unoccupied, implying that the occupancy probability is determined as 0%. Gray means that no statement regarding occupancy is possible, i.e. an occupancy probability of 50% is present. Black means that there is occupancy, the cell thus being assigned an occupancy probability of 100%. As can be seen in the example of FIG. 1, an unknown occupancy probability is assigned to the majority of the cells.

The measurements are performed by the vehicle 2 with the aid of cameras of the vehicle and of an SFM method. From the occupancy probabilities and the height information determined here for the segments of the environment, only the occupancy information is illustrated in FIG. 1. In the vehicle 2, the rear axle is symbolized by the transverse bar. The previous trajectory of the forward-moving vehicle 2 can be seen from the white track 3. The result of the occupancy detection of the environment after travelling over the track 3 is shown in FIG. 1.

Obstacles are present in each of the regions A and B in front of the vehicle. As a result of the detection properties of the SFM method used, these obstacles are, however, assigned a low occupancy probability. Obstacles are rarely measured in the SFM method due to the distance from the vehicle and the arrangement in the direction of travel in front of the vehicle.

Noise in the region E is also marked on FIG. 1.

Cells in the region C are incorrectly assigned occupancy probabilities greater than 50%, although there is no obstacle located there. This results from systematic measurement errors that occur repeatedly.

Obstacles which are frequently recognized as such during the measurements are located in the region D. These are consequently also represented with high occupancy probabilities in the environment map.

Figure 2:
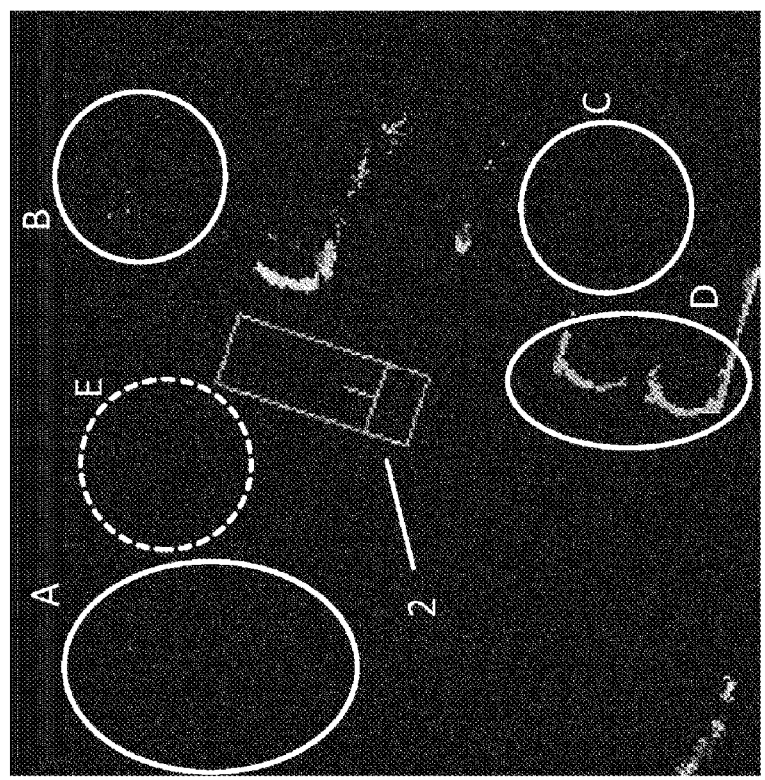
FIG. 2 is a measurement diagram showing an obstacle map generated according to the prior art.

FIG. 2 shows an obstacle map 4 according to an exemplary embodiment which, according to a threshold value application of the prior art is determined on the basis of the environment map according to FIG. 1. This obstacle map 4 shows height information that is individually assigned to cells recognized as being occupied by an obstacle. Black symbolizes cells for which no obstacle has been detected. Gray levels and white symbolize an obstacle and the height of the obstacle. To decide whether a cell is occupied by an obstacle, the occupancy probability of a cell (illustrated in FIG. 1) is compared in each case with the same threshold value, for example 0.6. As can be seen, this comparison does effectively suppress the noise in the region E and the systematic error in the region C. The obstacles in the regions A and B are also however not correctly detected or represented.

The use of a lower threshold value than in FIG. 2, while it would lead to representation of the obstacles in the regions A and B, would also, however, incorrectly display obstacles in the regions C and E. The use of a constant threshold value, as is known in the prior art, therefore does not deliver a satisfactory detection of obstacles while at the same time suppressing noise in the present example of the sensor measurements by means of SFM.

FIG. 3 shows an obstacle map 5 according to an exemplary embodiment of the invention. It was generated by applying the threshold value map 6 according to FIG. 4. The threshold value map 6 comprises just as many cells as the environment map 1. A threshold value is assigned by the threshold value map 6 to each cell of the environment map. In FIG. 4, the highest threshold value (region 7), for example 0.95, is represented by white, while the lowest (region 9), for example 0.3, by black. Gray levels (region 8) symbolize in-between values. As can be seen, the distribution of the threshold values depends on the previous trajectory of the vehicle. At the same time, the sensor properties of the SFM method, namely the greater difficulty in detecting obstacles at a greater distance and directly in front of the vehicle, are taken into account.

As was done for generation of the FIG. 2, the occupancy probabilities of the cells of the environment map 1 are compared with threshold values. However, in accordance with the invention, the threshold values for the individual cells of the environment map 1 are not consistent or constant, but, as explained, differ depending on the position (the line and column, for example) of the cell. As a result, the obstacles in the regions A and B are represented, while the noise and the detection of errors in the regions E and C are suppressed. The obstacles in the region D are, furthermore, correctly detected. On the whole, the obstacle map 5 thus represents the obstacles in the environment better than the result of the method of the prior art illustrated in obstacle map 4.

Figure 5:
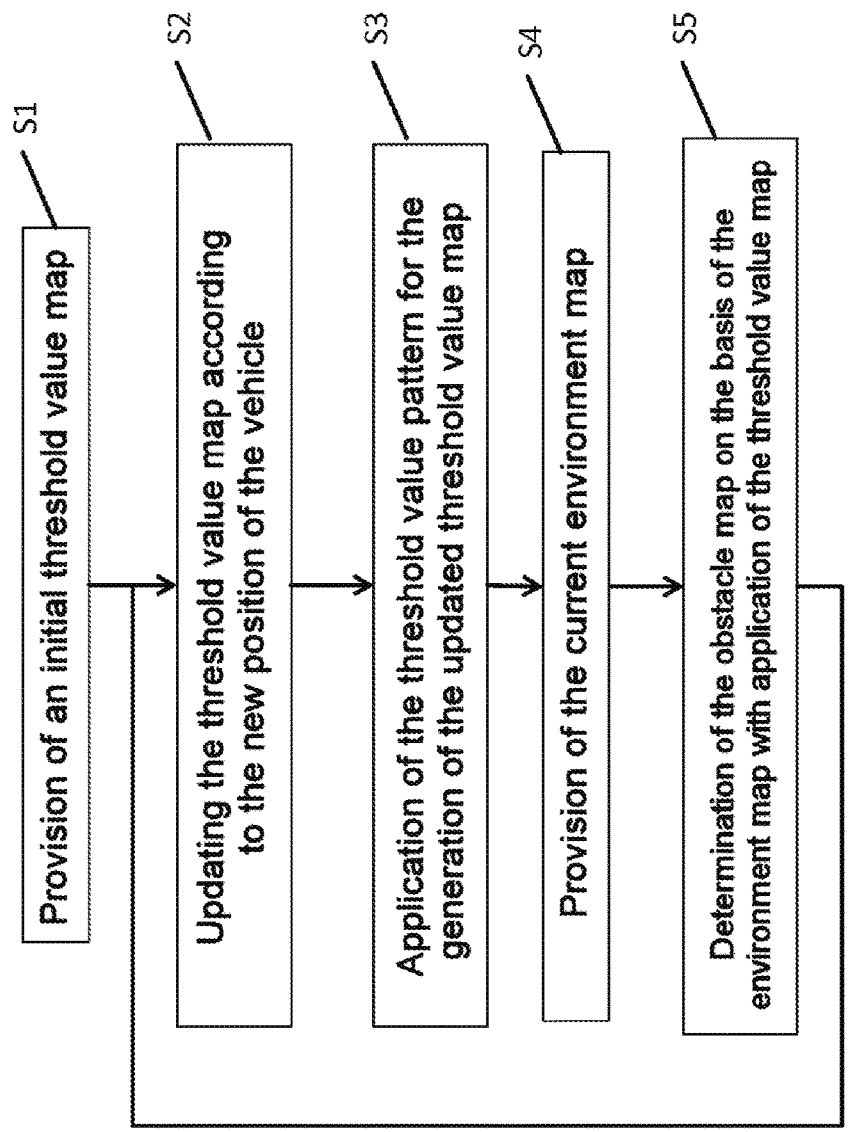
FIG. 5 shows a flow diagram of a method according to an exemplary embodiment.

The threshold value map 6 and the obstacle map are generated with the aid of an iterative method that is explained in FIG. 5. An initial threshold value map is made available in step S1. This can provide the same threshold value, 0.3 for example, for all the cells. This threshold value map is modified in step S2 according to the changed position (and orientation) of the vehicle. Typically this comprises a displacement and rotation of the threshold value map, if the threshold value map is always to remain symmetrical and arranged with an unchanging orientation with respect to the vehicle.

A threshold value pattern is applied to the threshold values of the individual cells of the threshold value map in step S3. The threshold value pattern can also be thought of as a threshold value map, to whose individual cells threshold value increments are assigned. These threshold value increments and threshold values are added to corresponding cells in order to obtain the updated threshold value map.

The threshold value increments are typically smaller than the threshold values of the initial threshold value map, for example 0.03, 0.05 or 0.07. If the addition would exceed a maximum threshold value, 0.95 for example, the threshold value of the cell under consideration is set to the maximum threshold value. The distribution of the level of the threshold value increments in the cells of the threshold value pattern can follow a conic function or a Gaussian curve.

It can immediately be understood that, through the repeated application of the threshold value pattern to the threshold value map created previously in each case, the threshold values of the threshold value map reflect the prior trajectory of the vehicle.

The current environment map is made available in step S4. As described previously, the current environment map is based on repeated entries of sensor readings (occupancy probabilities). The occupancy probabilities, which are embodied in a sensor measurement, are here added to occupancy probabilities previously detected for the same segment. The establishment of the threshold value map is therefore iterative, like the establishment of the environment map. It can be provided in the method that the sensor readings are incorporated a plurality of times into the environment map before being used as the basis for preparing a new obstacle map. The threshold value increments of the threshold value pattern are modified appropriately (i.e. higher).

The obstacle map is determined in the last step S5. Height information is only entered into the obstacle map for this purpose for those cells that have been detected as occupied. Those cells whose occupancy probability lies above the threshold value that is specified for the corresponding cell by the threshold value map are detected as being occupied.

The steps S2 to S5 are repeated on the basis of the newly prepared threshold value map.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for the preparation of an obstacle map, wherein the obstacle map comprises cells, wherein the method comprises:
    assigning each of the cells to segments of an environment of the vehicle;
    assigning to each of the cells information as to whether the corresponding segment of the environment is occupied by an obstacle;
    preparing an environment map, wherein the environment map comprises the cells;
    determining a threshold value specification,
        wherein the threshold value specification specifies different threshold values for the cells of the environment map,
        wherein the threshold value specification is determined depending on a trajectory of the vehicle; and
    preparing an obstacle map basis of the environment map and the threshold value specification.

2. The method as claimed in claim 1, wherein a threshold value pattern is repeatedly taken into account when determining the threshold value specification, wherein the threshold value pattern provides different threshold value increments for different cells of a group of cells.

3. The method as claimed in claim 2, wherein the threshold value specification comprises a threshold value map that gives a threshold value increment for each of the cells of the environment map.

4. The method as claimed in claim 3, wherein, when taking into account the threshold value pattern when determining the threshold value specification, the threshold value increments of the threshold value pattern are added to the threshold values of the threshold value map.

5. The method as claimed in claim 2, wherein the threshold value pattern is taken into account when determining the threshold value specification depending on a position and/or on an alignment of the vehicle in the environment map.

6. The method as claimed in claim 3, wherein the threshold value pattern is taken into account when determining the threshold value specification depending on a position and/or on an alignment of the vehicle in the environment map.

7. The method as claimed in claim 4, wherein the threshold value pattern is taken into account when determining the threshold value specification depending on a position and/or on an alignment of the vehicle in the environment map.

8. The method as claimed in claim 1, wherein the threshold value specification is further dependent on at least one of time and sensor measurements of the environment into the environment map.

9. The method as claimed in claim 2, wherein the threshold value specification is further dependent on at least one of time and sensor measurements of the environment into the environment map.

10. The method as claimed in claim 3, wherein the threshold value specification is further dependent on at least one of time and sensor measurements of the environment into the environment map.

11. The method as claimed in claim 4, wherein the threshold value specification is further dependent on at least one of time and sensor measurements of the environment into the environment map.

12. The method as claimed in claim 5, wherein the threshold value specification is further dependent on at least one of time and sensor measurements of the environment into the environment map.

13. The method as claimed in claim 1,
    wherein a same segment of the environment is assigned to each cell of the environment map as corresponding cells of the obstacle map, and
    wherein information for a given cell of the obstacle map is determined based on a comparison of an occupancy probability of a corresponding cell of the environment map with a threshold value given for the corresponding cell of the environment map in accordance with the threshold value specification.

14. The method as claimed in claim 2,
    wherein a same segment of the environment is assigned to each cell of the environment map as corresponding cells of the obstacle map, and
    wherein information for a given cell of the obstacle map is determined based on a comparison of an occupancy probability of a corresponding cell of the environment map with a threshold value given for the corresponding cell of the environment map in accordance with the threshold value specification.

15. The method as claimed in claim 3,
    wherein a same segment of the environment is assigned to each cell of the environment map as corresponding cells of the obstacle map, and
    wherein information for a given cell of the obstacle map is determined based on a comparison of an occupancy probability of a corresponding cell of the environment map with a threshold value given for the corresponding cell of the environment map in accordance with the threshold value specification.

16. The method as claimed in claim 4,
    wherein a same segment of the environment is assigned to each cell of the environment map as corresponding cells of the obstacle map, and
    wherein information for a given cell of the obstacle map is determined based on a comparison of an occupancy probability of a corresponding cell of the environment map with a threshold value given for the corresponding cell of the environment map in accordance with the threshold value specification.

17. The method as claimed in claim 5,
    wherein a same segment of the environment is assigned to each cell of the environment map as corresponding cells of the obstacle map, and
    wherein information for a given cell of the obstacle map is determined based on a comparison of an occupancy probability of a corresponding cell of the environment map with a threshold value given for the corresponding cell of the environment map in accordance with the threshold value specification.

18. The method as claimed in claim 8,
wherein a same segment of the environment is assigned to each cell of the environment map as corresponding cells of the obstacle map, and
wherein information for a given cell of the obstacle map is determined based on a comparison of an occupancy probability of a corresponding cell of the environment map with a threshold value given for the corresponding cell of the environment map in accordance with the threshold value specification.

19. An electronic control device for a vehicle, wherein the control device is configured to:
assign each of a plurality of cells comprising an obstacle map to segments of an environment of the vehicle;
assign to each of the plurality of cells information as to whether the corresponding segment of the environment is occupied by an obstacle;
prepare an environment map, wherein the environment map comprises the cells;
determine a threshold value specification,
wherein the threshold value specification specifies different threshold values for the plurality of cells of the environment map,
wherein the threshold value specification is determined depending on a trajectory of the vehicle; and
prepare an obstacle map basis of the environment map and the threshold value specification.

20. A vehicle comprising a control device, wherein the control device is configured to:
assign each of a plurality of cells comprising an obstacle map to segments of an environment of the vehicle;
assign to each of the plurality of cells information as to whether the corresponding segment of the environment is occupied by an obstacle;
prepare an environment map, wherein the environment map comprises the cells;
determine a threshold value specification,
wherein the threshold value specification specifies different threshold values for the plurality of cells of the environment map,
wherein the threshold value specification is determined depending on a trajectory of the vehicle; and
prepare an obstacle map basis of the environment map and the threshold value specification.

* * * * *